(12) United States Patent
Qian et al.

(10) Patent No.: US 11,240,269 B2
(45) Date of Patent: Feb. 1, 2022

(54) METHOD AND APPARATUS FOR DECRYPTION OF ENCRYPTED SSL DATA FROM PACKET TRACES

(71) Applicant: AT&T Intellectual Property I, L.P., Atlanta, GA (US)

(72) Inventors: Feng Qian, Basking Ridge, NJ (US); Oliver Spatscheck, Randolph, NJ (US); Subhabrata Sen, New Providence, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 264 days.

(21) Appl. No.: 16/530,529

(22) Filed: Aug. 2, 2019

(65) Prior Publication Data

US 2019/0356695 A1    Nov. 21, 2019

Related U.S. Application Data

(63) Continuation of application No. 14/547,792, filed on Nov. 19, 2014, now Pat. No. 10,375,112.

(51) Int. Cl.
*H04L 29/06* (2006.01)

(52) U.S. Cl.
CPC ...... *H04L 63/166* (2013.01); *H04L 29/06897* (2013.01); *H04L 29/06965* (2013.01);
(Continued)

(58) Field of Classification Search
CPC ........... H04L 12/2626; H04L 29/06884; H04L 29/06897; H04L 29/06965; H04L 63/1408;
(Continued)

(56) References Cited

U.S. PATENT DOCUMENTS

| 8,086,846 B2 | 12/2011 | Brabson |
| 8,225,085 B2 | 7/2012 | Karandikar |

(Continued)

FOREIGN PATENT DOCUMENTS

KR    2012043364    5/2012

OTHER PUBLICATIONS

Apostolopoulos et al., "Securing Electronic Commerce: Reducing the SSL Overhead," IEEE Network, vol. 14, No. 4, Jul./Aug. 2000, pp. 8-16.

(Continued)

*Primary Examiner* — Theodore C Parsons
(74) *Attorney, Agent, or Firm* — Guntin & Gust, PLC; Matthew Tropper

(57) ABSTRACT

An example first device disclosed herein is to obtain, from a library of the first device, a pre-master secret value and a master secret value associated with a session key for a communication session between the first device and a second device, the library instrumented to log the pre-master and master secret values during handshaking, the session key based on the pre-master secret value, the master secret value and data strings exchanged during the handshaking. The disclosed example first device is also to capture a packet level trace corresponding to the communication session, the packet level trace including the data strings and encrypted data. The disclosed example first device is further to determine the session key based on the pre-master secret value, the master secret value and the data strings without use of a proxy, and decrypt the encrypted data with the session key to obtain decrypted data.

20 Claims, 2 Drawing Sheets

(52) U.S. Cl.
CPC ...... *H04L 63/0471* (2013.01); *H04L 63/1408* (2013.01); *H04L 63/1425* (2013.01); *H04L 63/168* (2013.01); *H04L 63/0272* (2013.01); *H04L 63/0281* (2013.01); *H04L 63/306* (2013.01)

(58) Field of Classification Search
CPC . H04L 63/1425; H04L 63/166; H04L 63/168; H04L 63/0471; H04L 63/0281; H04L 63/0272; H04L 63/306
See application file for complete search history.

(56) References Cited

U.S. PATENT DOCUMENTS

| | | |
|---|---|---|
| 8,737,617 B2 | 5/2014 | Matsuo |
| 8,782,393 B1 | 7/2014 | Rothstein et al. |
| 2003/0016819 A1 | 1/2003 | Cheng |
| 2005/0138426 A1 | 6/2005 | Styslinger |
| 2006/0041938 A1 | 2/2006 | Ali |
| 2008/0130900 A1 | 6/2008 | Hsieh |
| 2009/0220080 A1 | 9/2009 | Herne et al. |
| 2010/0088766 A1 | 4/2010 | Michaely et al. |
| 2011/0022835 A1 | 1/2011 | Schibuk |
| 2012/0182884 A1 | 7/2012 | Pyatkovskiy et al. |
| 2014/0082204 A1 | 3/2014 | Shankar et al. |
| 2014/0115702 A1 | 4/2014 | Li et al. |
| 2016/0142440 A1 | 5/2016 | Qian et al. |

OTHER PUBLICATIONS

Coarfa et al., "Performance Analysis of TLS Web Servers," ACM Transactions on Computer Systems, vol. 24, No. 1, Feb. 2006, pp. 39-69.

Apostolopoulos et al., "Transport Layer Security: How Much Does it Really Cost?" 18th Annual Joint Conference of the IEEE Computer and Communications Societies, 1999, pp. 717-725.

United States Patent and Trademark Office, "Notice of Allowance," mailed in connection with U.S. Appl. No. 14/547,792, dated Mar. 25, 2019, 11 pages.

United States Patent and Trademark Office, "Non-final Office Action," mailed in connection with U.S. Appl. No. 14/547,792, dated Dec. 11, 2018, 6 pages.

United States Patent and Trademark Office, "Final Office Action," mailed in connection with U.S. Appl. No. 14/547,792, dated May 31, 2018, 19 pages.

United States Patent and Trademark Office, "Non-final Office Action," mailed in connection with U.S. Appl. No. 14/547,792, dated Nov. 15, 2017, 20 pages.

United States Patent and Trademark Office, "Final Office Action," mailed in connection with U.S. Appl. No. 14/547,792, dated Jun. 19, 2017, 19 pages.

United States Patent and Trademark Office, "Non-final Office Action," mailed in connection with U.S. Appl. No. 14/547,792, dated Feb. 23, 2017, 16 pages.

METHOD AND APPARATUS FOR DECRYPTION OF ENCRYPTED SSL DATA FROM PACKET TRACES

RELATED APPLICATION(S)

This application is a continuation of U.S. patent application No. 14/547,792, entitled "Method and Apparatus for Decryption of Encrypted SSL Data from Packet Traces," filed Nov. 19, 2014 (now U.S. Pat. No. 10,375,112). Priority to U.S. patent application No. 14/547,792 is hereby claimed. U.S. patent application No. 14/547,792 is incorporated herein by reference in its entirety.

BACKGROUND

The present disclosure relates generally to communications traffic analysis, and more particularly to decryption of encrypted SSL data from packet traces without using private keys or a proxy.

Network traffic analysis allows people to see how traffic in a network is distributed. Changes to data delivery routes can be based on a traffic analysis to lower delays in transmitting the data from one point to another. Network traffic analysis is harder to perform when network traffic is encrypted using one of various protocols.

Secure Sockets Layer (SSL) and Transport Layer Security (TLS) are cryptographic protocols that are used to secure communications over networks, such as the internet. SSL and TLS are used by critical application-layer protocols carrying world wide web traffic such as Hypertext Transfer Protocol Secure (HTTPS) and SPDY. In order for network traffic using these protocols to be analyzed, the communications must be decrypted. Various attempts to analyze communication traffic by decrypting SSL and TLS communications use additional infrastructures. The use of additional infrastructures can result in changes to a traffic pattern and content due to placement of additional devices, such as a proxy, in series with network traffic. For example, instead of network traffic traveling from point A to point B, the traffic travels from point A to a proxy and then from the proxy to point B. In addition to the use of an additional node (i.e., the proxy), data must also be addressed to not only point B but also to the proxy. The use of additional infrastructure may also result in incurring additional overhead due to the use of additional devices, such as a proxy.

Various methods have addressed the need to decrypt SSL/TLS traffic in various ways. One method ignores the content SSL/TLS traffic in packet level traces. In another method, some tools use servers' private keys for decryption. However, obtaining private keys of commercial servers is usually very difficult. A third method redirects traffic to a man-in-the-middle (MITM) SSL proxy. HTTPS requests are then terminated by the proxy and resent to a remote web server (e.g., an intended destination) in a new transmission control protocol (TCP) connection. This method requires a certificate of the proxy to be installed on a user device which transmits information via the proxy. To decrypt the SSL/TLS traffic, the private key of the proxy is provided to a program that can then decrypt the traffic transmitted through the proxy. This MITM approach requires additional infrastructures, incurs overhead due to the proxy, and changes the traffic pattern and content of communications.

SUMMARY

This disclosure addresses the problems of analyzing traffic using encrypted SSL data from packet traces. In one embodiment, the method includes identifying a session key associated with a communication session. The session key is identified during handshaking between a client and server before a communication session. Packet level traces of the communication session are identified and decrypted using the session key. Traffic is measured using the decrypted packet level traces. In one embodiment, a specific session key for the communication session is identified based on the client obtaining the session key from a library of session keys. The communication session can use a secure socket layer protocol or a transport layer security protocol. The library of session keys may be instrumented to detect session keys transmitted from the library of session keys. In one embodiment, traffic is measured based on decrypted packet level traces from a plurality of clients. Identified packet level traces of a communication session may be recorded in a format, such as packet capture (pcap), for decryption after the communication session has ended.

A system and computer readable medium for decryption of encrypted SSL data from packet traces without using private keys or a proxy are also described herein.

DETAILED DESCRIPTION

Figure 1:
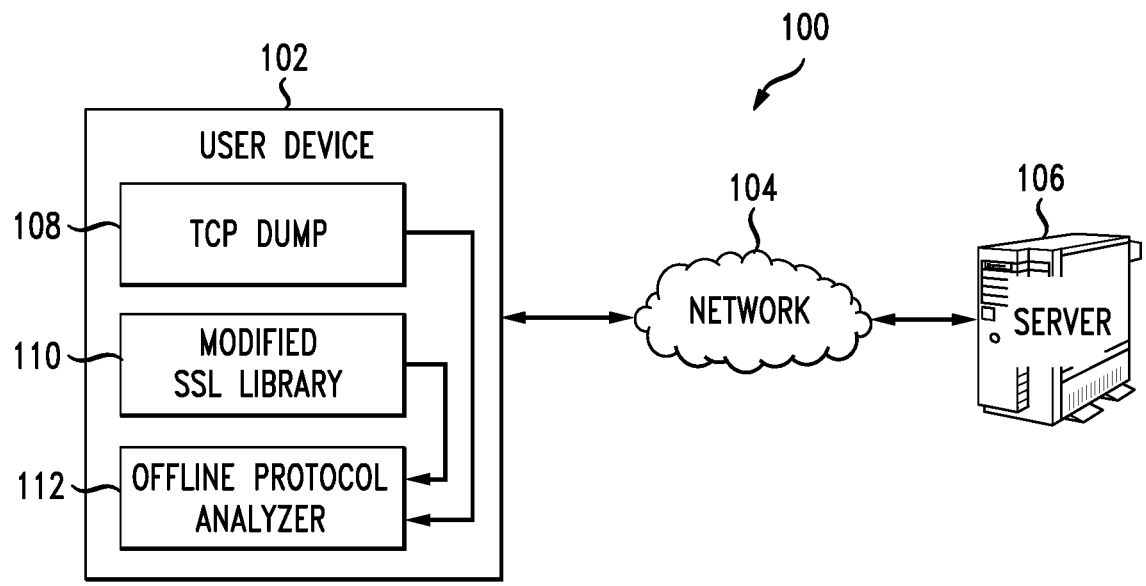
FIG. 1 depicts a system for decryption of encrypted Secure Sockets Layer (SSL) data from packet traces.

FIG. 1 depicts a system for decryption of encrypted Secure Sockets Layer (SSL) data from packet traces without using private keys or a proxy. Decryption of encrypted SSL data is accomplished by intercepting a session key associated with a communication session transmitted from a user device to a server during handshaking between the user device and the server. The session key is then used to decrypt packet level traces of the communication session. The decrypted packet level traces are then used to measure traffic. As used herein, secure sockets layer (SSL) includes SSL v2, SSL v3, and TLS v1 and may also include further versions of SSL and TLS as well as variants of SSL and TLS.

FIG. 1 depicts user device 102 which, in this example, is a smart phone, but may be any type of device capable of communication with other devices, such as server 106, using SSL and/or TLS cryptographic protocols. For example, user device 102 may be a desktop computer, tablet, cell phone, etc. User device 102 is in communication with server 106 via network 104. Server 106, in this example, is a computer but may be any type of device capable of capable of communication with other devices, such as user device 102, using SSL and/or TLS cryptographic protocols. Network 104 may be a wired network, wireless network, or combination wired and wireless network which is capable of supporting SSL and/or TLS cryptographic protocols.

User device 102 includes transmission control protocol (TCP) dump 108 which is a module on user device 102 and is used to collect raw data transmitted from and received by user device 102. In one embodiment, TCP dump 108 is used to gather packet level traces which can then be used to analyze communication traffic. User device 102 also includes modified SSL library 110 which is a module containing SSL/TLS session keys which are dumped during SSL/TLS handshaking in preparation for a communication session. In one embodiment, dumping of an SSL/TLS session key means modified SSL library 110 outputs a particular SSL/TLS session key for use with a communication session. For example, modified SSL library 110 outputs a particular session key in response to a request for a key for use with a communication session. The key is then used to encrypt information transmitted from user device 102 and decrypt information received by user device 102 during the communication session. In one embodiment, the key is symmetric. As such, the key can be used for decrypting uplink data (from user device 102 to server 106) and downlink data (from server 106 to user device 102). The key can be used to decrypt encrypted data. In one embodiment, computation of the SSL/TLS session key is carried out within modified SSL library 110. The session keys generated in modified SSL library 110 can be dumped by performing code instrumentation as described in further detail below.

TCP dump 108 and modified SSL library 110 are in communication with offline protocol analyzer 112 which, in this embodiment, is located on user device 102. In one embodiment, TCP dump 108 transmits packet level traces to offline protocol analyzer 112 for decryption using a session key output from modified SSL library 110 during handshaking in preparation for a communication session. Offline protocol analyzer 112 is configured to receive packet level traces from TCP dump 108 and decrypt the packet level traces using the SSL session key output from modified SSL library 110. Offline protocol analyzer 112 outputs decrypted packet level traces that may then be used to analyze communication traffic.

Figure 2:
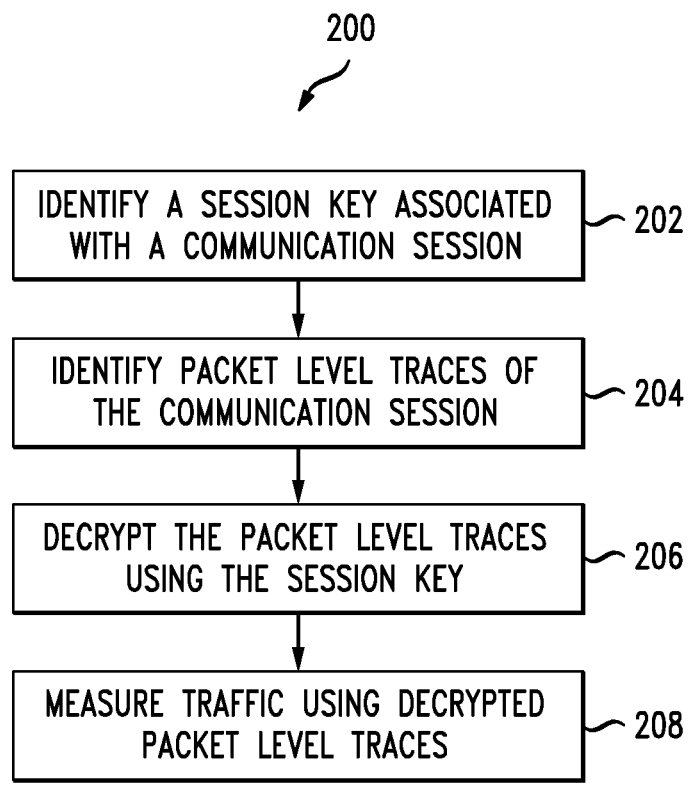
FIG. 2 is a flowchart showing a method for decrypting encrypted SSL data from packet traces according to one embodiment.

FIG. 2 depicts a flowchart of method 200 for decryption of encrypted SSL data from packet traces without using private keys or a proxy. In one embodiment method 200 is performed by user device 102. At step 202 a session key associated with a communication session is identified. As described above, the session key is dumped from modified SSL library 110 during handshaking between user device 102 and another device, such as server 106, in preparation for a communication session. At step 204, packet level traces transmitted from and received by user device 102 during a communication session associated with the session key dumped from modified SSL library 110 are identified. At step 206, the packet level traces are decrypted using the session key. At step 208, traffic is measured using the decrypted packet level traces.

In one embodiment, TCP dump 108 runs on user device 102 and records all traffic to and from user device 102. Traffic may be recorded in a specific format, such as packet capture (pcap) format, with negligible runtime overhead incurred. Recorded traffic may then be analyzed according to the TCP/IP (transmission control protocol/internet protocol) protocol specification by user device 102 or transmitted to another device for analysis. Recorded traffic may be stored for analysis after a specific time period, such as when a communication session has ended. In one embodiment, information pertaining to traffic from a plurality of offline protocol analyzers associated with a plurality of user devices is transmitted to a separate device for traffic analysis. The separate device, using the information from the plurality of user devices, can provide information pertaining to all network traffic (i.e., all traffic to and from the plurality of user devices.)

In one embodiment, the decryption of packet level traces at step 206 is facilitated by TCP dump 108, modified SSL library 110, and offline protocol analyzer 112 which operate as follows. During an SSL handshake, modified SSL library 110 dumps a premaster secret p, and a 48-byte master secret m to a debugging log. The premaster secret p and master secret m are transmitted to offline protocol analyzer 112 to be used for SSL decryption. Offline protocol analyzer 112 also receives packet level traces from TCP dump 108. Offline protocol analyzer 112 parses the TCP dump information from IP to application layers by following the TCP/IP protocol, the SSL/TLS protocol, and the application-layer protocol. For example, if the application-layer program is a web browser, offline protocol analyzer 112 can extract all web transfers (e.g., web communications) over hypertext transfer protocol (HTTP), hypertext transfer protocol secure (HTTPS), and SPDY.

SSL decryption is performed as follows according to one embodiment. During an SSL handshake, user device 102 generates a premaster secret p, encrypts p using public key $p_e$ associated with server 106, then sends $p_e$ to server 106, which decrypts $p_e$ using its private key. User device 102 and server 106 then independently compute master secret m:

$$m=\Theta(p,r_c,r_s)$$

where $\Theta$ is a publicly known function, $r_c$ and $r_s$ are random strings generated by user device 102 and server 106, respectively, at the beginning of the handshake. In one embodiment, $r_c$ and $r_s$ are exchanged in plain text. Multiple SSL sessions captured by TCP dump are output a list of ($r_c$, $r_s$, D) triples where D is the traffic data to be decrypted in an SSL session. Modified SSL library 110 provides a list of (p, m) pairs. The equation above bridges the two lists in order to facilitate associated of each (p, m) pair with its corresponding D. A final session key for decrypting D is derived from m, $r_c$, and $r_s$ using another publicly known function.

In one embodiment, modified SSL library 110 is instrumented to obtain session keys during handshaking in preparation for a communication session between user device 102 and server 106. The computation of the SSL/TLS session key is carried out within the modified SSL library. As such, the session keys can be captured by performing static or dynamic code instrumentation (i.e., inserting an instruction for dumping the session key at the appropriate location of the SSL library). In one embodiment, instrumentation means that the SSL session key computed inside the modified SSL library 110 is captured. The SSL session key can be further transmitted for use in decrypting encrypted data, such as packet level traces.

It should be noted that if method 200 shown in FIG. 2 is started in the middle of an SSL session, it may not be possible for the session to be decrypted since the session key was not captured during handshaking prior to the communication session. In one embodiment, modified SSL library 110 can be instrumented at all locations where decrypted bytes are delivered to upper layers.

In one embodiment, offline protocol analyzer 112 implements a specific RSA key exchange algorithm (e.g., the most popular). In view of the specific RSA key exchange algorithm used, the set of supported key exchange algorithms in a handshake message sent from user device 102 is restricted. In other embodiments, one or more different key exchange algorithms may be used. In such other embodiments, the set of supported key exchange algorithms in the handshake message sent from user device 102 includes the additional key exchange algorithms.

Figure 3:
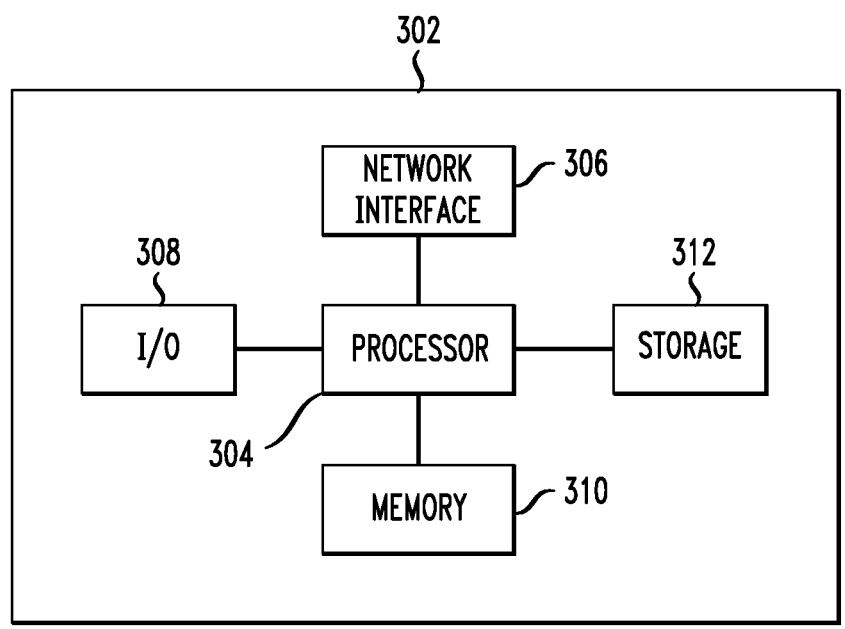
FIG. 3 shows a high-level block diagram of a computer for decryption of encrypted SSL data from packet traces according to one embodiment.

User device 102 and server 106 may be implemented using a computer. A high-level block diagram of such a computer is illustrated in FIG. 3. Computer 302 contains a processor 304 which controls the overall operation of the computer 302 by executing computer program instructions which define such operation. The computer program instructions may be stored in a storage device 312, or other computer readable medium (e.g., magnetic disk, CD ROM, etc.), and loaded into memory 310 when execution of the computer program instructions is desired. Thus, the method steps of Fgiure 2 can be defined by the computer program instructions stored in the memory 310 and/or storage 312 and controlled by the processor 304 executing the computer program instructions. For example, the computer program instructions can be implemented as computer executable code programmed by one skilled in the art to perform an algorithm defined by the method steps of FIG. 2. Accordingly, by executing the computer program instructions, the processor 304 executes an algorithm defined by the method steps of FIG. 2. The computer 302 also includes one or more network interfaces 306 for communicating with other devices via a network. The computer 302 also includes input/output devices 308 that enable user interaction with the computer 302 (e.g., display, keyboard, mouse, speakers, buttons, etc.) One skilled in the art will recognize that an implementation of an actual computer could contain other components as well, and that FIG. 3 is a high level representation of some of the components of such a computer for illustrative purposes.

The foregoing Detailed Description is to be understood as being in every respect illustrative and exemplary, but not restrictive, and the scope of the inventive concept disclosed herein is not to be determined from the Detailed Description, but rather from the claims as interpreted according to the full breadth permitted by the patent laws. It is to be understood that the embodiments shown and described herein are only illustrative of the principles of the inventive concept and that various modifications may be implemented by those skilled in the art without departing from the scope and spirit of the inventive concept. Those skilled in the art could implement various other feature combinations without departing from the scope and spirit of the inventive concept.

What is claimed is:

1. A first device comprising:
    a memory including computer readable instructions; and
    a processor to execute the computer readable instructions to perform operations, the operations comprising:
        obtaining, from a library of the first device, a pre-master secret value and a master secret value associated with a session key for a communication session between the first device and a second device, the library being instrumented to log the pre-master secret value and the master secret value during handshaking between the first device and the second device, and the session key being based on the pre-master secret value, the master secret value and data strings exchanged between the first device and the second device during the handshaking;
        capturing a packet level trace corresponding to the communication session, the packet level trace including the data strings and encrypted data associated with the communication session;
        determining the session key based on the pre-master secret value, the master secret value and the data strings without use of a proxy, wherein the determining of the session key includes:
            evaluating a function with the pre-master secret value and the data strings to determine an output value of the function; and
            comparing the output value of the function with the master secret value to determine that the master secret value is associated with the encrypted data; and
        decrypting the encrypted data of the packet level trace with the session key to obtain decrypted data for traffic measurement.

2. The first device of claim 1, wherein the function is a first function, and the determining of the session key further includes evaluating a second function with the master secret value and the data strings to determine the session key.

3. The first device of claim 1, wherein the capturing of the packet level trace includes recording the packet level trace in a packet capture format.

4. The first device of claim 1, wherein the communication session corresponds to one of a secure socket layer protocol session or a transport layer security protocol session.

5. The first device of claim 1, wherein the decrypting of the encrypted data of the packet level trace with the session key to obtain the decrypted data for traffic measurement occurs after the communication session has ended.

6. The first device of claim 1, wherein the data strings are exchanged between the first device and the second device in plain text.

7. The first device of claim 1, wherein the first device comprises a smart phone.

8. A computer readable memory comprising computer readable instructions that, when executed by a processor of a first device, cause the processor to perform operations, the operations comprising:
    obtaining, from a library of the first device, a pre-master secret value and a master secret value associated with a session key for a communication session between the first device and a second device, the library being instrumented to log the pre-master secret value and the master secret value during handshaking between the first device and the second device, and the session key being based on the pre-master secret value, the master secret value and data strings exchanged between the first device and the second device during the handshaking;
    capturing a packet level trace corresponding to the communication session, the packet level trace including the data strings and encrypted data associated with the communication session;
    determining the session key based on the pre-master secret value, the master secret value and the data strings without use of a proxy, wherein the determining of the session key includes:
        evaluating a function with the pre-master secret value and the data strings to determine an output value of the function; and
        comparing the output value of the function with the master secret value to determine that the master secret value is associated with the encrypted data; and
    decrypting the encrypted data of the packet level trace with the session key to obtain decrypted data for traffic measurement.

9. The computer readable memory of claim 8, wherein the function is a first function, and the determining of the session key further includes evaluating a second function with the master secret value and the data strings to determine the session key.

10. The computer readable memory of claim 8, wherein the capturing of the packet level trace includes recording the packet level trace in a packet capture format.

11. The computer readable memory of claim 8, wherein the communication session corresponds to one of a secure socket layer protocol session or a transport layer security protocol session.

12. The computer readable memory of claim 8, wherein the decrypting of the encrypted data of the packet level trace with the session key to obtain the decrypted data for traffic measurement occurs after the communication session has ended.

13. The computer readable memory of claim 8, wherein the data strings are exchanged between the first device and the second device in plain text.

14. The computer readable memory of claim 8, wherein the first device comprises a smart phone.

15. A method comprising:
obtaining, from a library of a first device, a pre-master secret value and a master secret value associated with a session key for a communication session between the first device and a second device, the library being instrumented to log the pre-master secret value and the master secret value during handshaking between the first device and the second device, and the session key being based on the pre-master secret value, the master secret value and data strings exchanged between the first device and the second device during the handshaking;
capturing, by executing first instructions with a processor of the first device, a packet level trace corresponding to the communication session, the packet level trace including the data strings and encrypted data associated with the communication session;
determining, by executing second instructions with the processor of the first device, the session key based on the pre-master secret value, the master secret value and the data strings without use of a proxy, wherein the determining of the session key includes:
evaluating a function with the pre-master secret value and the data strings to determine an output value of the function; and
comparing the output value of the function with the master secret value to determine that the master secret value is associated with the encrypted data; and
decrypting, by executing third instructions with the processor of the first device, the encrypted data of the packet level trace with the session key to obtain decrypted data for traffic measurement.

16. The method of claim 15, wherein the function is a first function, and the determining of the session key further includes evaluating a second function with the master secret value and the data strings to determine the session key.

17. The method of claim 15, wherein the capturing of the packet level trace includes recording the packet level trace in a packet capture format.

18. The method of claim 15, wherein the communication session corresponds to one of a secure socket layer protocol session or a transport layer security protocol session, and the data strings are exchanged between the first device and the second device in plain text.

19. The method of claim 15, wherein the decrypting of the encrypted data of the packet level trace with the session key to obtain the decrypted data for traffic measurement occurs after the communication session has ended.

20. The method of claim 15, wherein the first device comprises a smart phone.

* * * * *